United States Patent [19]

Baugh et al.

[11] 3,898,616

[45] Aug. 5, 1975

[54] THRESHOLD LOGIC CIRCUIT FOR DETECTING EXACTLY M OUT OF A SET OF N SIGNALS

[75] Inventors: Charles Richmond Baugh, Lincroft; Bruce Allen Wooley, Colts Neck, both of N.J.

[73] Assignee: Bell Telephone Laboratories, Incorporated, Murray Hill, N.J.

[22] Filed: July 18, 1974

[21] Appl. No.: 489,572

[52] U.S. Cl. .......................... 340/146.1 AB; 307/231

[51] Int. Cl.[2] .......................... G06F 11/08

[58] Field of Search ........... 340/146.1 AB; 307/211, 307/231

[56] References Cited

UNITED STATES PATENTS

| | | | |
|---|---|---|---|
| 2,675,538 | 4/1954 | Malthaner et al. | 340/146.1 AB |
| 2,675,539 | 4/1954 | McGuigan | 340/146.1 AB |
| 2,688,050 | 8/1954 | Harris | 340/146.1 AB |
| 3,164,727 | 1/1965 | Heyda | 340/146.1 AB |
| 3,470,532 | 9/1969 | Martens et al. | 340/146.1 AB |
| 3,533,066 | 10/1970 | Rees | 340/146.1 AB |
| 3,610,842 | 10/1971 | Formenti et al. | 340/146.1 AB |

*Primary Examiner*—Charles E. Atkinson
*Attorney, Agent, or Firm*—W. Ryan

[57] ABSTRACT

Many of the complexities of prior art M-out-of-N detectors, including exhaustive gating and table look-up, are avoided in an M-out-of-N detector using threshold logic circuits suitable for integrated circuit fabrication. Input binary signals on each of N input leads direct an incremental current through one or the other of two summing resistors common to all inputs. One of the summing resistors sums current increments associated with the number of binary 1s in the N-bit input, and the other summing resistor derives the same result for 0s. The differential voltage generated across the summing resistors is level shifted and combined with separately derived threshold signals before being applied to a pair of differential switches. The outputs from the circuit, typically wired-OR and wired-AND functions of the outputs of the differential switches, are the required detection signal and its complement.

Other related applications of the input summing/differential switch combinations are also disclosed.

10 Claims, 12 Drawing Figures

THRESHOLD LOGIC CIRCUIT FOR DETECTING EXACTLY M OUT OF A SET OF N SIGNALS

BACKGROUND OF THE INVENTION

The present invention relates to electronic detection circuits for identifying the presence of exactly M out of a maximum possible number N of input signals. More particularly, the present invention relates to threshold logic circuit apparatus for performing an M-out-of-N code detection.

PRIOR ART

Many electrical communication and control systems require the identification of one of a plurality of signals, subsystems or other entities. A convenient means for designating such entities involves the use of plural signal codes. For example, individual subsystems may be addressed by a multidigit code unique to that subsystem. In memory systems it is common to designate each location by a separate binary address. In other cases it is desirable to select a predetermined number M out of a maximum number N of code signals to identify a particular system entity. Thus, for example, it is not uncommon in telephone technology to designate each of the 10 decimal digits by a so-called 2-out-of-5 code.

In general, then, "M-out-of-N" codes are characterized by the requirement that each code word contain exactly M 1s and N-M 0s (or the converse) for the binary case. Since the number of 1s and 0s is the same in all valid code words, such codes are also referred to as constant-weight codes. The advantages of M-out-of-N codes include the facts that (1) all single-bit bit errors are detectable, (2) all multiple bit unidirectional errors (either 1s change to 0s or 0s changes to 1s, but not both) are detectable, (3) only compensating errors (the same number of 1s change to 0s as 0s change to 1s) go undetected, (4) decoding is accomplished simply with an M-input AND gate, and (5) timing information can be extracted from the code words.

Error detection, for example, is achieved using an M-out-of-N detector, the output of which is 1 if and only if any set of M of the N inputs are 1 and the remaining N-M inputs are 0. Only compensating errors, where there remain M 1s in the code word, cannot be detected with an M-out-of-N detector. Single bit errors are detectable because they result in M−1 or M+1 1s. Similarly, multiple bit unidirectional errors are detectable since they lead to M-$q$ or M+$q$ 1s, where $q$ is the number of erroneous bits. Loss of power or loss of a gating or enabling pulse result in such unidirectional errors.

Prior art systems including M-out-of-N codes for particular values of M and N are described, for example, in U.S. Pat. Nos. 3,786,496 issued Jan. 15, 1974 to Verbaas; and 3,588,879 issued June 28, 1971 to Litofsky. Other M-out-of-N circuits are described, for example, in "C-MOS May Help Majority Logic Win Designers' Vote," by L. Garrett, *Electronics*, Jul. 19, 1973, pp. 107–112; "Multiplexer Technique Solves X-out-of-Y Bit Pattern-Recognition," by L. Furnanz, *Electronic Design*, Jan. 18, 1973, p. 70; and "ROMs Cut Cost, Response Time of M-out-of-N Detectors," by A. W. Kobylar et al, *Electronics*, Feb. 15, 1973, pp. 112–114.

Prior art efforts at realizing M-out-of-N detectors using standard logic have given rise to circuits of considerable complexity, propagation delay and power dissipation. See, for example, D. A. Anderson and G. Metze, "Design of Totally Self-Checking Check Circuits for M-Out-Of-N Codes, " *IEEE Trans. Comput.*, Vol. C-22, pp. 263–269, March 1973. An efficient circuit based on the Anderson-Metze algorithm in realizing a 4-out-of-9 detector using standard emitter couple logic circuits has been found to have a propagation delay of approximately 12 nsec, while dissipating approximately 1.5 watts.

As can be seen from the several references cited above, M-out-of-N detectors in general involve considerable circuit complexity and attendant high cost. It is therefore an object of the present invention to provide circuits having decreased complexity for performing the M-out-of-N detection function.

Threshold logic circuits have long been known in the electronic arts, but have been used to only a relatively small extent because of somewhat greater complexity at the fundamental module level. Recent advances in large scale integrated transistor circuits have, however, suggested the possible application of threshold logic circuits for realizing, among other things, special purpose arithmetic circuits such as multipliers. For example, U.S. Pat. No. 3,524,977 issued Aug. 18, 1970 to M. C. Wang describes a threshold logic adder-based binary multiplier. Efficient utilization of threshold logic circuits has, however, heretofore not been practiced for realizing M-out-of-N detectors.

It is therefore a further object of the present invention to provide efficient threshold logic circuits for implementing an M-out-of-N detection function, while also providing low power dissipation and small propagation delay.

SUMMARY OF THE INVENTION

Many of the complexities of prior art M-out-of-N detectors, including exhaustive gating and table look-up, are avoided in a typical embodiment of the present invention assuming the form of an integrated M-out-of-N detector using threshold logic circuits. Input binary signals on each of N input leads direct an incremental current through one or the other of two summing resistors common to all inputs. One of the summing resistors sums current increments associated with the number of binary 1s in the N-bit input, and the other summing resistor derives the same result for 0s. The differential voltage generated across the summing resistors is level shifted and combined with separately derived threshold signals before being applied to a pair of differential switches. The outputs from the circuit, typically wired-OR and wired-AND functions of the outputs of the differential switches, are the required detection signal and its complement.

In an exemplary embodiment, a 4-out-of-9 detector is shown in a form suitable for integrated circuit implementation. Low propagation time and greatly decreased power dissipation are realized using the present invention in accordance with the following detailed teachings.

DETAILED DESCRIPTION

Threshold Logic Circuits Generally

A Boolean functin $f(\vec{X})$ of N variables, $\vec{X}=(x_1, \ldots, x_N)$ is a *threshold function* if there exist an integer T' and a vector of integers $\vec{W}=(w_1, \ldots, w_N)$ such that $$f(\vec{X})=\begin{cases} 1 \text{ if } \vec{W}.\vec{W}=\sum_{i=1}^{N} w_i x_i > T' - 0.5 \triangleq T \\ 0 \text{ if } \vec{W}.\vec{X} < T \end{cases} \quad (1)$$

The *weights* $w_i$ and *threshold* T are called *structure* of $f(\vec{X})$, denoted [$\vec{W}$;T]. From this definition it is obvious that many conventional gates are special cases of threshold functions. For example, a structure for a 3-input AND gate is [1,1,1;2.5], and a structure for a 4-input NOR gate is [−1, −1, −1, −1; −0.5]. These are very simple threshold functions.

Useful tutorial sources on the subject of threshold logic functions and circuits are S. Muroga, *Threshold Logic and Its Application*, Wiley, New York, 1971; and D. Hampel and R. O. Winder, "Threshold Logic," *IEEE Spectrum*, Vol. 8, pp. 32–39, May 1971. Particular circuits useful in realizing threshold functions in related contexts are described in U.S. Pat. Nos. 3,524,977 issued Aug. 18, 1970 to M. C. Wang, and 3,725,687 issued Apr. 3, 1973 to J. D. Heightley. The Wang and Heightley patents are hereby incorporated by reference.

It should be clear that, in general, a single threshold logic circuit is capable of implementing a more complicated logic function than simple gate circuits, thereby reducing the total number of fundamental logic modules and the attendant interconnections. D. Hampel, J. H. Beinart and K. J. Prost, in "Threshold Logic Implementation of a Modular Computer System Design," *NASA Report CR*-1668, Oct. 1970, indicate that a threshold logic realization of typical systems gives rise to a logic module reduction of 3:1 or greater as compared to NAND-gate circuitry. Interconnections between modules are correspondingly reduced by as much as 5:1. See also "Multifunction Threshold Gates," by D. Hampel, *IEEE Trans. on Comp.*, Vol C-22, No. 2, February 1973, pp. 197–203.

M-out-of-N Codes Generally

The number of code words available in an M-out-of-N code is given by $$\binom{N}{M}.$$

For a given N, this quantity is maximxized when $$M=\left\lfloor \frac{N}{2} \right\rfloor,$$

where $\lfloor x \rfloor$ denotes the integer part of $x$. Therefore, the maximum number of words available in an M-out-of-N code is $$\binom{N}{\left\lfloor \frac{N}{2} \right\rfloor} = \frac{N}{\left\lfloor \frac{N}{2} \right\rfloor ! \left\lfloor \frac{N+1}{2} \right\rfloor !} \approx 2^N \sqrt{\frac{2}{\pi N}}. \quad (2)$$

A conventional N'-bit binary code provides $2^{N'}$ words, the maximum number possible in a N'-bit code. Thus, it follows from (1) that the number of bits, N', needed in a binary code to provide at least the capacity of an $\left\lfloor \frac{N}{2} \right\rfloor$-out-of-$N$ code is approximately $$N' = N - \left\lfloor \frac{1}{2} \log_2 \left\lceil \frac{\pi N}{2} \right\rceil \right\rfloor. \quad (3)$$

Figure 1:
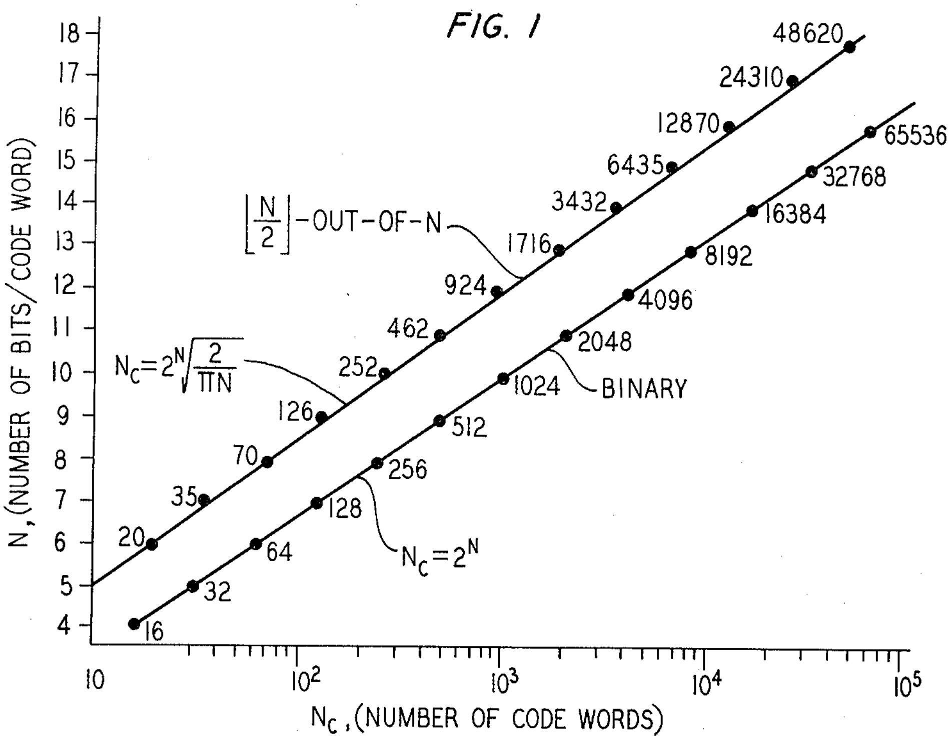
FIG. 1 compares the number of bits required for binary and M-out-of-N codes having the same number of code words.

In FIG. 1 the number of bits in a code word is plotted as a function of the number of code words available for both $\left\lfloor \frac{N}{2} \right\rfloor$-out-of-$N$ and N-bit binary codes. For up to $2.7 \times 10^{11}$ words the number of additional bits required by the M-out-of-N code as compared to a binary codes is at most three. If a parity bit is added to the binary code to provide minimal, single-bit error detection, then the difference in word length is at most one bit for up to 126 words and two bits for up to $2.7 \times 10^{11}$ words. Thus it can be seen that the advantages of M-out-of-N codes can be achieved at relatively modest cost.

Figure 2:
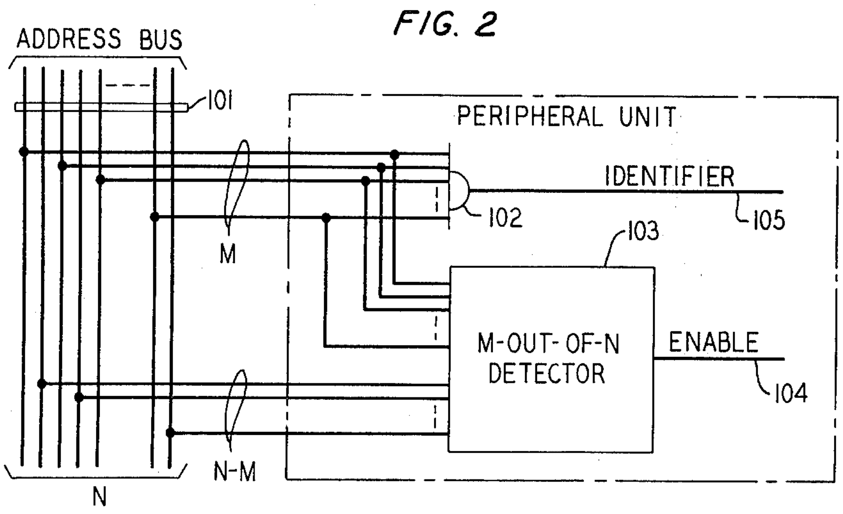
FIG. 2 illustrates an application of an M-out-of-N detector.

FIG. 2 shows as typical application of an M-out-of-N detector a peripheral addressing circuit in a computer system or the like. A total of N bits are available on the address bus 101. Of these, exactly M are required to identify the particular peripheral unit; these are identified as the inputs to AND gate 102. The remaining N-M inputs, as well as the M identification inputs are applied to M-out-of-N detector 103. Only if the appropriate M signals, say M binary 1s, appear as inputs to AND gate 102, and only these M 1s appear on bus 101, will the enable output 104 permit the peripheral unit to be selected by the AND gate output 105. If more than M inputs are 1 the peripheral unit will not be selected, even if all of the inputs to AND gate 102 are 1s.

A 4-Out-Of-9 Detector

The present invention will now be described in further detail, using as an example a 4-out-of-9 detector. This particular choice of M and N will provide a useful comparison with prior art circuits typified by those described in the Anderson-Metze paper, supra.

Figure 3:
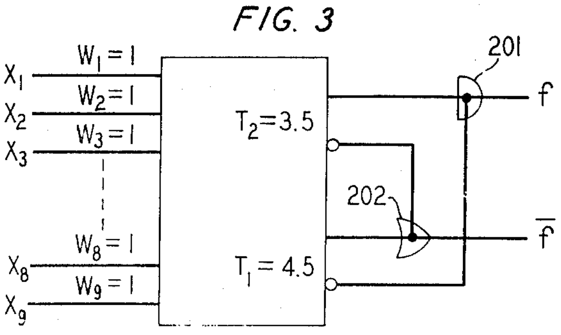
FIG. 3 is a schematic diagram of a 4-out-of-9 detector using threshold logic conventions.

FIG. 3 shows a schematic representation of a 4-out-of-9 detector utilizing two threshold functions. The threshold functions shown in FIG. 3 have uniform weights for input variables, i.e., $w_i = 1$ for $i = 1, 2, \ldots, 9$, and thresholds $T_1 = M+0.5$ and $T_2 = M-0.5$. The gate 201 is a "wired-AND" gate, and gate 202 a "wired-OR" gate. A detailed implementation will now be presented for the circuit represented schematically in FIG. 3.

Figure 4:
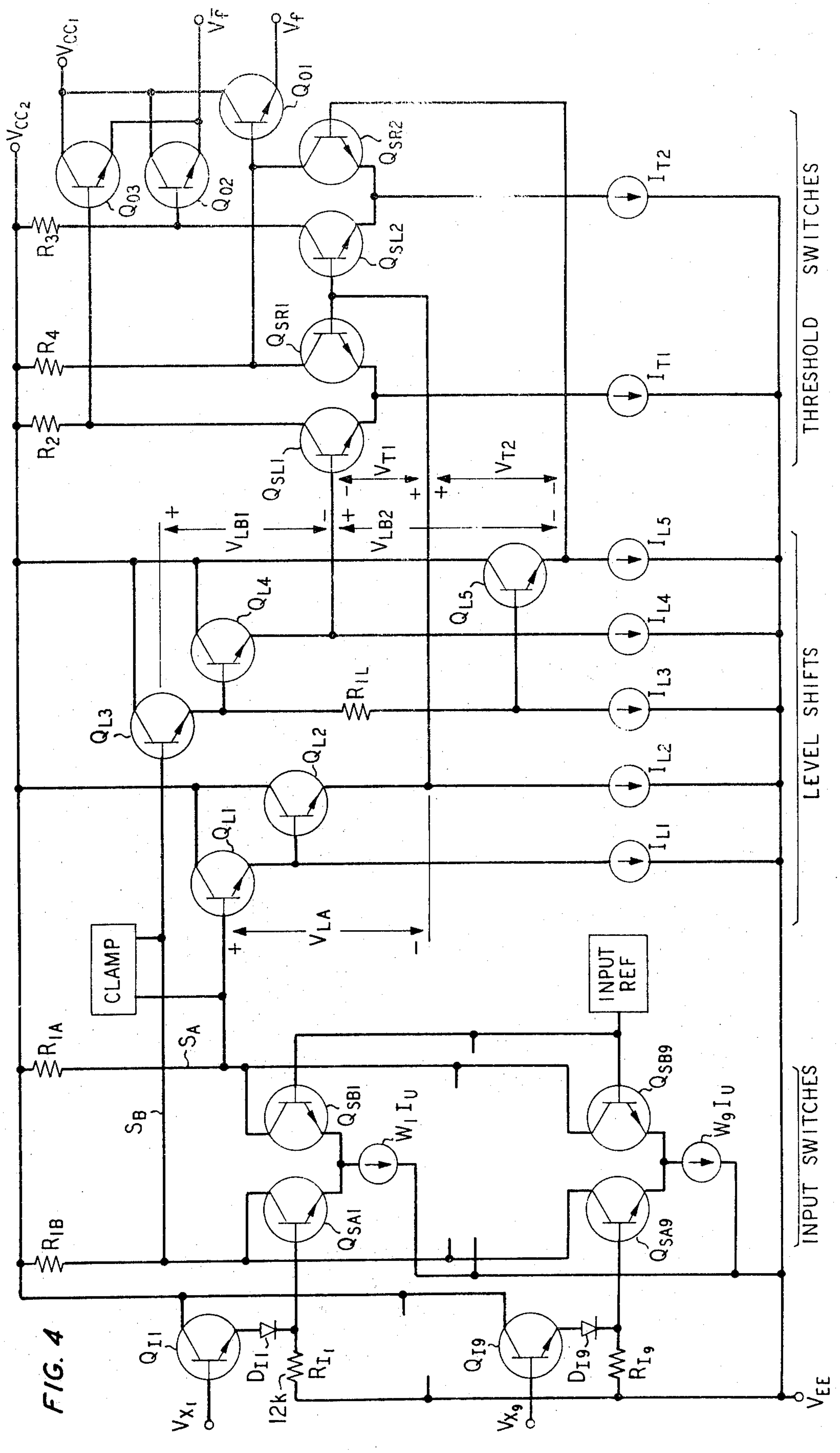
FIG. 4 is an overall schematic diagram of a 4-out-of-9 detector in accordance with one embodiment of the present invention.

An integrated circuit configuration suitable for implementation on a single integrated circuit chip is advantageously used. FIG. 4 shows a circuit suitable for such implementation. In this configuration input signals $V_{x_i}$, $i = 1,2 \ldots, 9$, are level shifted in respective level-shifting circuits including $Q_{I_i}$ a transistor connected in the common collector (emitter follower) configuration between bias signals $V_{CC2}$ and $V_{EE}$. The $12k$ ohm resistor $R_{I_i}$ and diode $D_{I_i}$ provide the appropriate level shifting for an input signal $V_{x_i}$. The outputs derived across the respective resistors $R_{I_i}$ are applied to the bases of the inputs on the input switches, as indicated in FIG. 4. Each input switch comprises a transistor pair $Q_{SAi}$ and $Q_{SBi}$, $i = 1,2, \ldots, 9$. The currents from the input switches are summed in the substantially identical resistors $R_{1A}$ and $R_{1B}$, thereby establishing the voltages at the sum nodes $S_A$ and $S_B$. These sum node voltages are then level-shifted by the network including current sources $I_{L1}$ through $I_{L5}$, resistor $R_{1L}$ and transistors $Q_{L1}$ through $Q_{L5}$, and the level-shifted outputs are used to drive two threshold current switches differentially.

Each threshold current switch comprises a transistor pair connected in a differential configuration, i.e., emitters connected to a common point and bases connected to respective level-shifted signals. In FIG. 4, $Q_{SL1}$ and $Q_{SR1}$form one threshold switch transistor pair and $Q_{SL2}$ and $Q_{SR2}$ the other such pair.

Wired-AND and wired-OR functions of the appropriate outputs of the threshold current switches conveniently provide the 4-out-of-9 detection function and its complement. $Q_{01}$ provides the wired-AND function of the nominal outputs of the threshold switches. If the collector of $Q_{SR1}$ is nominally high, indicating that the summed, level-shifted inputs fail to exceed the $T_1 = 4.5$ threshold, and the collector of $Q_{SR2}$ is nominally high, indicating that the summed, level-shifted inputs exceed the $T_2 = 3.5$ threshold, then the emitter of $Q_{01}$ will be high when connected to an appropriate load. When either of the two last-mentioned high collector conditions does not exist, the low collector reduces the level of the other collector as well. The emitter of $Q_{02}$ is high whenever the collector of $Q_{SL2}$ is high, and the emitter of $Q_{03}$ is high whenever the collector of $Q_{SL1}$ is high. These high conditions indicate either that the input signals cause $T_1 = 4.5$ to be exceeded or they fail to cause $T_2$ 32 3.5 to be exceeded; in either event a high level appears on the $\bar{V}_f$ output.

The threshold values, $T_1$ and $T_2$, in the circuit of FIG. 4 are established by the relative magnitudes of the level-shifting voltages $V_{LA}$, $V_{LB1}$ and $V_{LB2}$. Outside the threshold decision region, the voltages at the sum nodes are clamped in both positive and negative directions in order to ensure adequate internal voltage margins and minimize the circuit propagation delay under worst case input conditions. The input, output and power supply levels of the circuit are compatible with conventional 10,000 series emitter coupled logic circuits. See, for example, *MECL Integrated Circuits Data Book*, Third Edition, Motorola Semiconductor Products, Inc., September 1973 for typical circuits in this series.

In the unclamped region of operation, the nomimal voltages at the sum nodes $S_A$ and $S_B$ in the circuit of FIG. 4 are given approximately by $$V_{SA} = V_{CC} - \left[ \sum_{i=1}^{9} \bar{x}_i \right] I_u R_{1A} \tag{4}$$

and $$V_{SB} = V_{CC} - \left[ \sum_{i=1}^{9} x_i \right] I_u R_{1B}, \tag{5}$$

where $I_u$ is the unity-weight source current, and it is noted that $w_i = 1$ for $i = 1,2, \ldots, 9$. The differential voltages applied to the threshold current switches can be expressed as $$V_{T1} = (V_{SA} - V_{LA}) - (V_{SB} - V_{LB1}) \tag{6}$$

and $$V_{T2} = (V_{SA} - V_{LA}) - (V_{SB} - V_{LB1} - V_{LB2}) = V_{T1} + V_{LB2}. \tag{7}$$

Also, if in FIG. 4 $I_{L1} = I_{L3} \approx 2I_u$ and $I_{L2} = I_{L4} = I_{L5} \approx I_u$, then $$V_{LB1} = V_{LA} \tag{8}$$

and $$V_{LB2} = I_{L3} R_{1L} \approx 2 I_u R_{1L}. \tag{9}$$

If $R_1$ is defined as the nominal value of the summing and level-shifting resistors, $$R_1 \triangleq R_{1A} = R_{1B} = R_{1L}, \tag{10}$$

then it follows from (4)-(10) that $$V_{T1} \approx \left[ \sum_{i=1}^{9} (x_i - \bar{x}_i) \right] I_u R_1 \tag{11}$$

and $$V_{T2} \approx V_{T1} + 2 I_u R_1. \tag{12}$$

Upon introduction of the relationship $$\sum_{i=1}^{9} \bar{x}_i = 9 - \sum_{i=1}^{9} x_i \tag{13}$$

into (11), it follows that $$V_{T1} \approx 2\left[\sum_{i=1}^{9} x_i - 4.5\right] I_u R_1 \qquad (14)$$

and $$V_{T2} \cong 2\left[\sum_{i=1}^{9} x_i - 3.5\right] I_u R_1. \qquad (15)$$

The threshold values $T_1$ and $T_2$ correspond to the hypothetical conditions where $V_{T1} = 0$ and $V_{T2} = 0$, respectively. Thus, it is easily seen from (14) and (15) that $T_1 = 4.5$ and $T_2 = 3.5$. It is also apparent from these equations that the minimum increment in $V_{T1}$ and $V_{T2}$ is $2I_uR_1$, and that the minimum nominal voltage applied to a threshold current switch is $I_uR_1$. In the 4-out-of-9 detector the value chosen for $I_uR_1$ is approximately 250 mV.

Each of the thresholds $T_i$ is established by comparing two different voltages across the two inputs of a differential current switch, both of these voltages being generated from the input signal conditions. This differential circuit approach to establishing a threshold has the advantage of producing a balanced circuit. Thus, the sensitivity of circuit operation to the absolute values of device parameters is minimized, and performance depends primarily on matching of nominally identical parameters. The latter is much more easily controlled. The balanced nature of the differential circuit also increases the immunity of the overall circuit to variations in power supplies and variations in temperature-dependent device parameters. For a given margin requirement, the balanced circuit also permits the resolution of a maximum threshold value $T_i$ twice that obtainable when the thresholds are established using a fixed reference network in a single-ended circuit, e.g., those circuits described in Hampel and Winder "Threshold Logic," *IEEE Spectrum*, May 1971, pp. 32–39. This factor of two increase in the maximum threshold results from the requirement that the change in voltage at a sum node in a singled-ended circuit (for a single input variable change) is twice that needed in a differential circuit. It is assumed, of course, that the margin specified at the input of the threshold current switch is the same for both circuits.

The thresholds $T_1$ and $T_2$ in the circuit of FIG. 4 may be identified with changes in polarity of the voltages $V_{T1}$ and $V_{T2}$, respectively. The point at which $V_{T1}$ and $V_{T2}$ change polarities is, in turn, established by the level-shifting network. In the 4-out-of-9 circuit shown in FIG. 4, the voltage across $R_{1L}$ is chosen to satisfy the conditions stated in Table 1.

Table 1

| No. Inputs High | Polarity of $V_{SA}-V_{SB}$ | Polarity of $V_{T1}$ | Polarity of $V_{T2}$ | $V_f$ |
|---|---|---|---|---|
| ≤3 | — | — | — | Low |
| 4 | — | — | + | High |
| ≥5 | + | + | + | Low |

The circuit of FIG. 4 can be used to implement a conventional threshold logic element by using only one threshold switch. This requires only the removal of $R_2$, the $T_1$ threshold switch, $I_{T1}$, $Q_{L4}$ and $I_{L4}$ and $Q_{03}$. The threshold is then established by varying the voltage across $R_{1L}$.

In order to avoid the saturation of transistors in the level-shift current sources, the voltages at the sum nodes $S_A$ and $S_B$ must be limited in the negative direction. If this limit is imposed by clamping the sum node voltages, a larger value can be used for $I_uR_1$ than would be possible if the currents from all nine of the input current switches were allowed to be drawn through $R_{1A}$ or $R_{1B}$. Also, if the sum node voltages are clamped in both the positive and negative directions the propagation delay is reduced in situations such as that where four inputs are changed from a low to a high condition while the remaining inputs are held low. Of course, in the region where switching of the threshold current switches occurs, both sum nodes must be unclamped.

Figure 5:
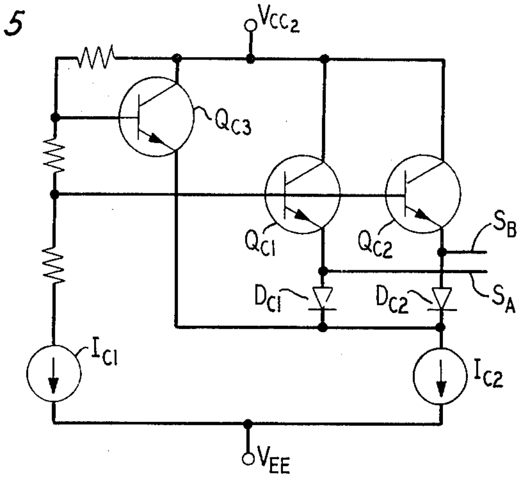
FIG. 5 illustrates a clamp circuit used in the circuit of FIG. 4.

The sum node clamp in the circuit of FIG. 4 is implemented as shown in FIG. 5. The sum node voltages are clamped in the negative direction by the emitter-followers $Q_{C1}$ and $Q_{C2}$. The emitter-following $Q_{C3}$, diodes $D_{C1}$ and $D_{C2}$, and the current source $I_{C2}$ provide clamping in the positive direction.

For the 4-out-of-9 circuit shown in FIG. 4 the only voltages of special interest are those established by 3, 4, or 5 inputs high. Voltages associated with 3 or fewer inputs high can be clamped to voltages associated with 3 inputs high without altering the operation of the circuit. At sum node $S_B$, the voltage corresponding to 3 inputs high is a lower bound for a clamp in the positive direction, while at sum node $S_A$ the voltage with 3 inputs high is an upper bound for a clamp in the negative direction. Similarly, the voltage associated with 5 or more inputs high can be clamped to voltages associated with 5 inputs high. Thus, the voltage at sum node $S_B$ with 5 inputs high is a lower bound for clamping this node in the positive direction while the voltage at sum node $S_A$ with 5 inputs high is an upper bound for clamping $S_A$ in the negative direction.

The voltage $V_B^i$ at sum node $S_B$ with $i$ inputs high ($i = 3,4,5$) is $$V_B^i \simeq V_{CC} - iR_{1B}I_u.$$

The voltage $V_A^i$ at sum node $S_A$ with $i$ inputs high ($i = 3,4,5$) is $$V_A^i \simeq V_{CC} - (9-i)R_{1A}I_u.$$

The previously stated conditions for the bounds on the clamp voltages are tabulated in Table 2.

Table 2

| No. Inputs High | $V_{SB}$ | $V_{SA}$ |
|---|---|---|
| 3 or less | $\geq V_B^3$ | $\leq V_A^3$ |
| 4 | $= V_B^4$ | $= V_A^4$ |
| 5 or more | $\leq V_B^5$ | $\geq V_A^5$ |

One purpose served by the clamping in the negative direction by the circuit of FIG. 5 is to better utilize the limited voltage swing available at each sum node. Instead of dividing the voltage swing available at the sum node into nine equal increments (one for each input $V_{x_i}$), the voltage can be divided into fewer increments. Each of these increments then consists of a larger percentage of the total available swing. These larger increments ease the tolerance and margin requirements for the overall circuits of FIG. 4.

Clamping in both the positive and negative directions improves the propagation delay of the circuit by minimizing the effect of the parasitic capacitance at the sum nodes. Thus, it would take the voltage at the sum node longer to reach the threshold points for $T_1$ and $T_2$ when 4 inputs change from low to high if there were no clamp than when the same change occurs with the sum node clamped at the voltage associated with 3 inputs high. The required voltage swing is clearly smaller.

Figure 6:
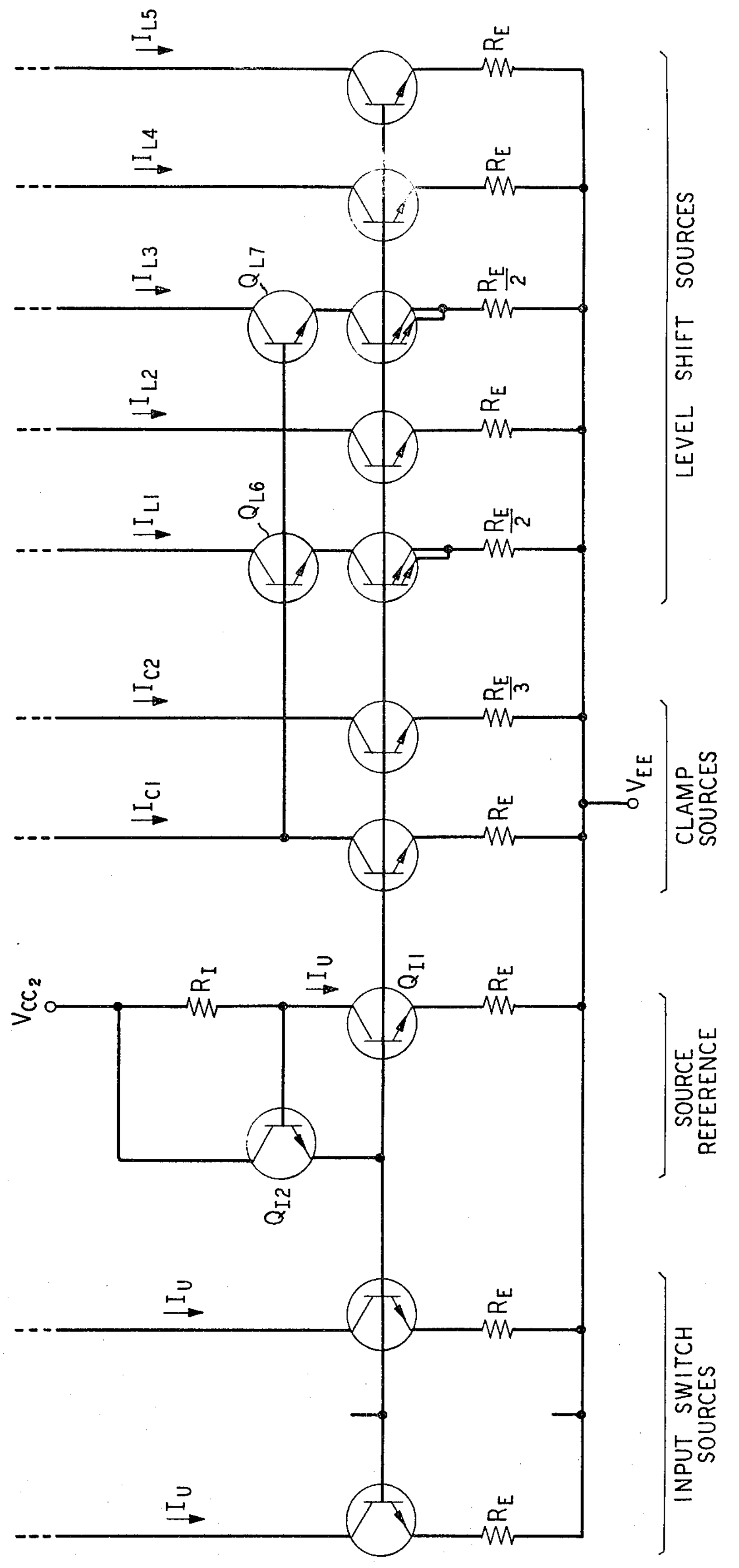
FIG. 6 is a circuit representation of various current sources used in the circuit of FIG. 4.

The current sources for the input current switches and level-shifting networks in FIG. 4 and the clamp circuit of FIG. 5, are realized as shown in FIG. 6. Conventional transistor current sources with resistive emitter degeneration are used. The emitter resistors increase the current source output impedances and improve the matching between the source currents. In the 4-out-of-9 detector, the emitter resistance $R_E$ is equal to the summing resistance $R_{1A}$. The reference current for the current sources is established in the resistor $R_I$; this resistor is buffered from the base currents of the current source transistors by the emitter-follower $Q_{I2}$. The nominal unity weight source obtained with the circuit of FIG. 6 is approximately $$\left[ I_u \simeq V_{CC} - V_{EE} - \Phi_{I1} - \Phi_{I2} \right] \left[ \frac{1}{R_I + R_E} \right], \quad (16)$$

where $\phi_{I1}$ and $\phi_{I2}$ are the base-emitter voltages of $Q_{I1}$ and $Q_{I2}$. It is apparent from (16) that $I_uR_1$ voltage drops in the circuit of FIG. 4 depend primarily on the supply voltages and ratios of resistors. Consequently, such drops are relatively insensitive to both environment and circuit processing.

The common-base transistor $Q_{L7}$ is used in the level-shift current source $I_{L3}$ in order to match the voltage drop across the level-shifting resistor $R_{1L}$ as closely as possible to the voltage drop resulting from two units of current in summing resistor $R_{1A}$. The common-base gain of $Q_{L7}$ balances the transmission through the input current switches. The transistor $Q_{L6}$ is used to balance $Q_{L7}$ so as to match the base-emitter voltages of the level-shifting transistors $Q_{L1}$ and $Q_{L3}$ in FIG. 4.

Figure 7:
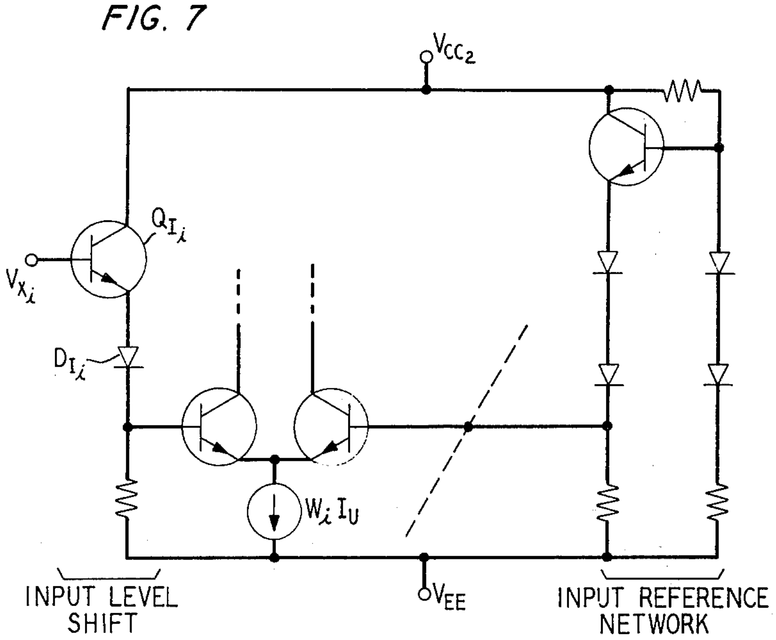
FIG. 7 is a circuit diagram of an input reference network used in the circuit of FIG. 4.
Figure 8:
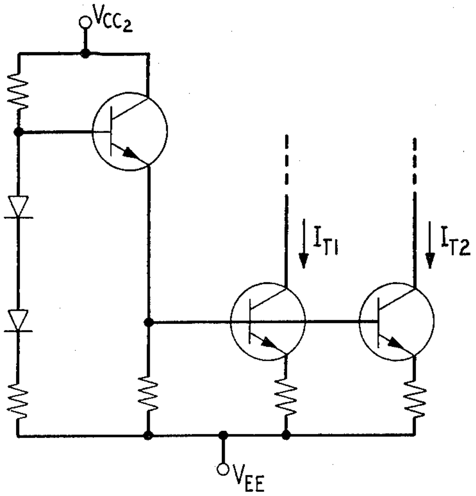
FIG. 8 is a circuit diagram of another current source used in the circuit of FIG. 4.

The reference network for the nine input current switches is shown in FIG. 7. This network results in a $V_{BB}$ reference for the input signals that is characteristic of 10,000 series ECL. Output levels compatible with 10,000 series ECL are obtained by realizing the current sources for the threshold current switches as shown in FIG. 8. The networks in both FIG. 7 and FIG. 8 are similar to those used in conventional ECL circuits containing active current sources.

Emphasis in the design of the circuit in FIG. 4 has been placed on minimizing the sensitivity of the circuit to processing and environment. Further the circuit of FIG. 4 is realizable, at reasonable yields, with conventional diffusion processing. The standard buried layer process described, for example, in R. M. Warner (Ed.), *Integrated Circuits Design Principles and Fabrication*, McGraw Hill, 1965, may be used. The differential nature of the circuit results in excellent circuit balance, the maximum obtainable margins for the voltages applied to the threshold current switches, and a low sensitivity to common-mode variations in the circuit. Also, the differential voltages in the circuit depend primarily on nominally identical resistors, which permit the best possible resistance matching.

The effectiveness of the design approach used in the circuit of FIG. 4 depends largely on the magnitude of the voltage $I_uR_1$ needed to completely and reliably switch the threshold current switches. The results of a statistical analysis of the differential circuit configuration indicate that a standard deviation of 1 percent in the matching of nominally identical diffused resistors will result in a standard deviation of approximately 25 mV for voltages $V_{T1}$ and $V_{T2}$. The 1 percent matching of identical resistors is typical of the results obtainable with standard diffusion processing. Hence, the circuit of FIG. 4 could reasonably be used for values of $I_uR_{1A}$ of 200 mV. Such a value permits the detection of codes as large as 7-out-of-15, which contains 6435 code words.

The 4-out-of-9 detection circuit of FIG. 4 is readily integrated using conventional buried collector diffusion processing with single-level metalization. See, for example, the Warner book, supra. The dimensions of a typical resulting integrated circuit, measured to the outer isolation wall, are approximately 91×103 mils. Such a circuit typically contains 90 transistors, 59 base-diffusion resistors, and three $n^+$-diffusion crossunders. Typical minimum metal spacing and minimum metal width are both $12\mu$, and typical minimum transistor emitter size is $18\mu$ square. For diffusion processing like that described in the reference, a base diffusion depth of $2\mu$ and a base sheet resistance of 200 Ω/square are typical. The process results in peak common-emitter current gain-bandwidth product, $f_t$, of approximately 700 MHz for the cited minimum geometry transistors.

Figure 9A:
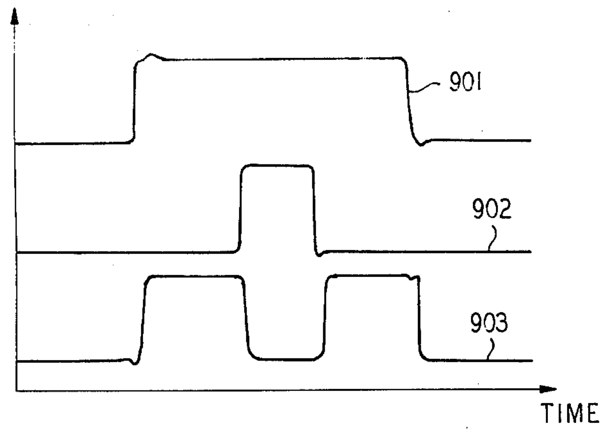
FIGS. 9A-C illustrate various waveforms associated with the circuit of FIG. 4.
Figure 9B:
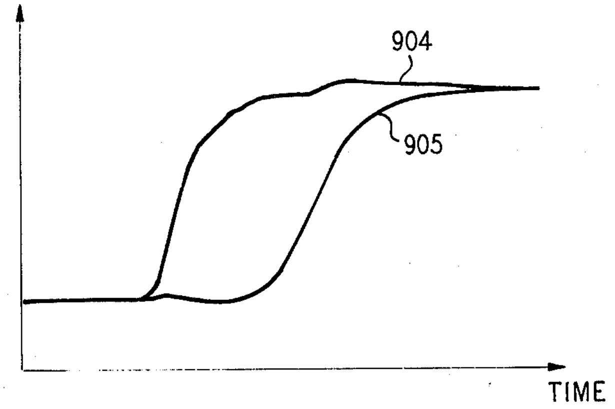
Figure 9C:
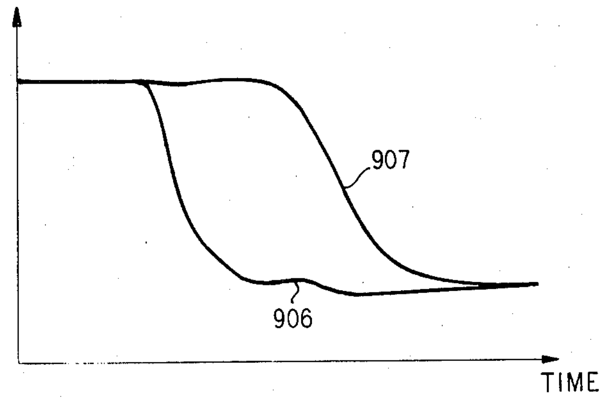

The response of the integrated 4-out-of-9 detector is illustrated in FIGS. 9A-C. In FIG. 9A, the upper trace 901 displays the pulse applied to each of an arbitrary set of four of the nine inputs. The pulse in the middle trace 902 is applied to a fifth input, and the remaining four inputs are held low. The output of the detector is shown in the lower trace 903. The output changes from low to high when the four inputs are taken high. Upon switching the fifth input high, the output returns to the low level. Thus, exactly 4-out-of-9 detection is provided.

Typical rise and fall waveform characteristics of the detector are illustrated in FIGS. 9B and 9C. In FIG. 9C, initially three inputs are assumed high and six are low; one of the low inputs 904 is then switched high and the output 905 is realized. A typical propagation delay is 14 nsec and the 20 percent-80 percent rise time is 7 nsec. In FIG. 9C four inputs are high and five are low initially, and one high input 906 is switched low to give the output 907. This situation was found to be the worst case input condition with regard to propagation delay. A typical worst case propagation delay is 16 nsec. The corresponding 20 percent-80 percent fall time is 7 nsec.

Typical power-dissipation in the circuits of FIGS. 4–8 with the responses shown in FIGS. 9A-C is 100 mW with a 5.2 V power supply; the functional power-delay product is therefore only 1600 pJ. As indicated in FIGS. 9A-C, the pulse response of the detector is quite smooth. Measurements of the output levels of the circuit as a function of temperature confirm a temperature dependence typical of 10,000 series ECL.

The performance of the integrated 4-out-of-9 detector is summarized in Table 3 along with the performance of an efficient realization using NOR-gate logic. The NOR-gate detector used for comparison was realized with 10,000 series ECL. As indicated in Table 3, the integrated threshold 4-out-of-9 detector provides relatively high-speed performance while achieving an order-of-magnitude reduction in power-delay product. At the same time, the threshold logic approach results in a substantial reduction in interconnection and device count.

Table 3

| | Threshold Logic 4-of-9 | NOR-gate 4-of-9 |
|---|---|---|
| Propagation Delay | 16 nsec | 12 nsec |
| Power Dissipation | 100 nW | 1,500 mW |
| Power-Delay Product | 1600 pJ | 18,000 pJ |

In implementing the 4-out-of-9 detector of FIGS. 4–8, threshold logic has been used in an externally transparent manner; its application is of no concern to a user of the detector. The threshold logic circuit approach employed is on-chip compatible with emitter-coupled logic, and represents a powerful supplement to conventional current-switching circuit techniques. As evidenced by the 4-out-of-9 detector, the threshold logic approach can be used to achieve a dramatic reduction in power dissipation, interconnections, and device count.

While the preceding detailed description has emphasized a particular 4-out-of-9 detector, those skilled in the art will recognize variations in device fabrication techniques, resistor and voltage levels which will be appropriate in particular cases. Further, though a 4-out-of-9 detector was disclosed in detail, other values for M and N in an M-out-of-N detector may be constructed in accordance with the above teachings. In particular, by appropriately choosing the threshold values $T_1$ and $T_2$ and the resistors $R_{1A}$, $R_{1B}$, $R_{1L}$, $R_E$, and $R_I$, a wide variety of values for M and N can be accommodated. More specifically, a total of N input switches is required to be connected to the sum nodes $S_A$ and $S_B$. The individual $I_uR_1$ voltage increments are adjusted to ensure that $V_{cc} - (M+2)\ I_uR_1$ does not cause saturation of the input switches. This, in turn, requires varying the ratio of values of the resistors in FIG. 6, e.g., causing $R_I$ to change in proportion to changes in M, while holding $R_E$ constant.

Further, while the circuit of FIG. 4 illustrates the use of differential threshold circuits in performing an M-out-of-N detection function, such differential threshold techniques have utility separate from such applications. Thus the widening of margins resulting from the use of differential threshold techniques may make the application of threshold logic functions possible where this would otherwise not be the case if only standard "single-ended" threshold circuits were available.

Figure 10:
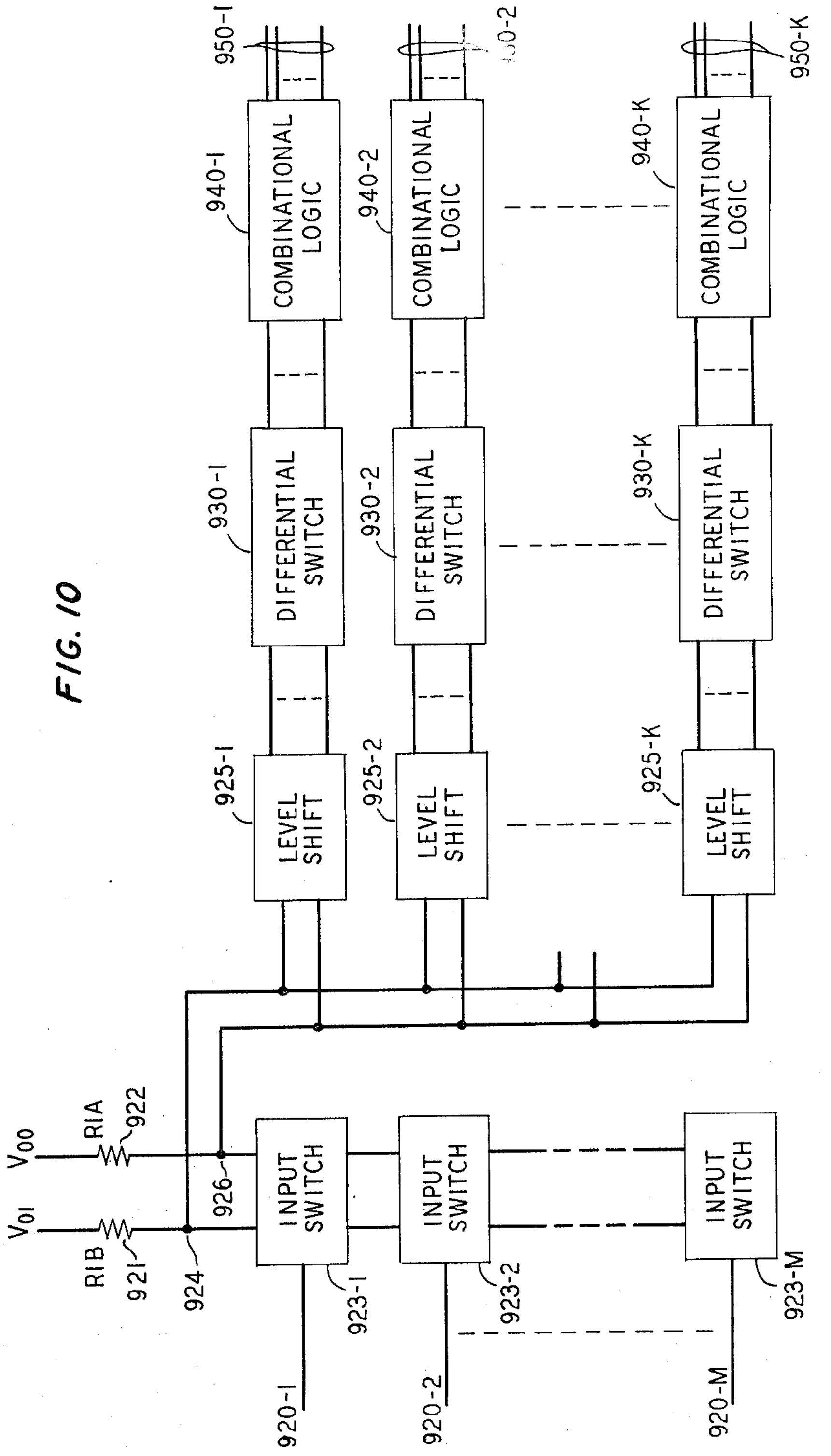
FIG. 10 shows a generalization of the differential input and level shifting networks used in FIG. 4.

FIG. 10 shows a generalized configuration for the basic operational elements of the circuit of FIG. 4. Each of M input leads 920-*i*, *i* = 1,2, . . . , M are shown there applied to respective input switches 923-*i*. As in the circuit of FIG. 4, the state (0 or 1) of each input lead causes an incremental current to pass through a corresponding one of the resistors R1A and R1B (921 and 922) in FIG. 10. Level shifting circuits like those used on the inputs in FIG. 4 may also be used to advantage here to standardize the signals applied to the current-increment-generating differential pairs. Further, as in the circuit of FIG. 4, each incremental current through one of the resistors R1B or R1A causes a corresponding voltage drop in the respective one of these resistors. Such an input-dependent voltage drop substracts from the supply voltage, $V_{01}$ or $V_{00}$, to generate at respective nodes 924 and 926 a voltage representative of the number of inputs having a 0 signal level (at node 924) or a 1 signal level (at node 926). While the voltages corresponding to $V_{01}$ and $V_{00}$ were taken in FIG. 4 to be equal, no such limitation is fundamental to the present invention. Likewise, the resistors R1A and R1B need not be substantially identical in value, as was the case in the circuit of FIG. 4.

A plurality of level shifting circuits 925-*i*, *i* = 1,2, . . . , *K*, receives the signals from nodes 924 and 926. Suitable clamping circuits can be used at nodes 924 and 926 as described in connection with the circuit of FIG. 4 when excessive voltage swings would otherwise cause saturation to occur. Each of the level shifting circuits 925-*i* is functionally equivalent to the corresponding elements in FIG. 4. The exact shifting of each of the node signal inputs is, however, individually determined by straight-forward analyses based on those given above. Essentially, then, arbitrarily shifted differential signals (having well defined relationships to the signals at nodes 924 and 926) are generated on the outputs from the level shifting circuits 925-*i*. The number of such circuits 925-*i* is not related in any necessary way to the numbers M or N.

Each of a plurality of differential switches 930-*i*, *i* = 1,2, . . . ,K, receive the outputs from respective ones of level shifting networks 925-*i*. As in the case of the circuit of FIG. 4, each of the differential switches 930-*i* is arranged to receive input voltages and to generate either of two outputs depending upon whether the voltages at nodes 924 and 926 (as level shifted by the networks 925-*i*) bear a particular relationship to applied threshold signals. Although differential switches shown in FIG. 4 occur in pairs, i.e., including $Q_{SL1}$, $Q_{SR1}$, $Q_{SL2}$ and $Q_{SR2}$, this paired switch arrangement is not fundamental to the present invention in its broader aspects, and is not continued in FIG. 10. Each of the differential switch blocks 930-*i* is therefore seen to have an arbitrary number of inputs (to account for an arbitrary number of voltage differences) and an arbitrary number of outputs (each nominal switch output and its complement).

Finally, the circuit of FIG. 10 shows connected to the outputs of each of the differential switches 930-*i* a combinational logic network 940-*i* for generating on output leads 950-*i* signals representative of desired logic functions of the differential switch outputs. It will be recognized, for example, that the circuit of FIG. 4 included a wired-OR and a wired-AND function of the differential switch outputs.

Broadly speaking, then, the circuit of FIG. 10 generalizes the basic configuration of the circuit shown in FIG. 4 to provide for a variety of level shifting and differential switching functions (and logic functions of switch outputs) based on the number of inputs having a prescribed logic level. FIG. 4 represents a particular implementation of the circuit of FIG. 10 where K = 1, R1A = R1B, $V_{01} = V_{00}$, and the specified logic functions are simple AND and OR functions.

While each of the level shifting networks 925-*i* is shown receiving dual inputs, i.e., inputs from each of the nodes 924 and 926, a function of a voltage appearing at only one of these nodes may be operated on as well. Recall the discussion of single differential switch outputs above. Thus the level shifting network **925-*i* may receive a single variable input and, by virtue of shifting relative to other fixed inputs, generates a relatively larger differential signal suitable for driving the corresponding differential switch and combinational logic networks 930-*i* and 940-*i***, respectively.

What is claimed is:

1. Apparatus comprising

A. input circuit means responsive to N input digital signals for generating a first differential pair of signals representative of the number of input signals having a prescribed value, B. level shifting means responsive to said first differential pair of signals for generating $N_1$ pairs of second differential signals, $N_1 > 1$, and C. $N_1$ first differential switches, each comprising means for generating an output whenever a respective one of said pairs of second differential signals exceeds a respective first predetermined value.

2. Apparatus comprising

A. input circuit means responsive to N input digital signals for generating a first differential pair of signals representative of the number of input signals having a prescribed value, B. level shifting means responsive to said first differential pair of signals for generating $N_1$ pairs of second differential signals, $N_1 \geq 1$, wherein said level shifting means comprises means for generating $N_2$ pairs of third differential signals, $N_2 \geq 1$, C. $N_1$ first differential switches, each comprising means for generating an output whenever a respective one of said pairs of second differential signal exceeds a respective first predetermined value, and D. $N_2$ differential switches, each comprising means for generating an output whenever a respective one of said pairs of third differential signals fails to exceed a second predetermined value.

3. Apparatus comprising

A. input circuit means responsive to N binary-valued input digital signals for generating a first differential pair of signals representative of the number of input signals having a prescribed value, said input circuit means comprising first summing means for generating first sum signals representing the number of input signals having one of said binary values, B. level shifting means responsive to said first differential pair of signals for generating $N_1$ pairs of second differential signals, $N_1 \geq 1$, and C. $N_1$ first differential switches, each comprising means for generating an output whenever a respective one of said pairs of second differential signal exceeds a respective first predetermined value.

4. Apparatus according to claim 2 wherein $N_1 = N_2$.

5. Apparatus according to claim 4 further comprising $N_1$ combinational logic circuits, each responsive to the outputs of respective ones of said first and second differential switches for generating an output whenever a prescribed logic function is satisfied by said outputs of said respective ones of said first and second differential switches.

6. Apparatus according to claim 4 wherein $N_1 = N_2 = 1$.

7. Apparatus according to claim 6 wherein said input signals are binary signals having a value of 0 or 1, and wherein said input circuit means comprises first summing means for generating first sum signals representing the number of input signals having a value of 0, second summing means for generating second sum signals representing the number of input signals having a value of 1, and said first differential pair of signals being represented by said first and second sum signals.

8. Apparatus according to claim 7 wherein said first and second summing means comprise, respectively, first and second summing resistors and first and second means responsive to applied input signals for applying to the respective one of said resistors an incremental current for each input signal having a value of 0 or 1, respectively.

9. Apparatus according to claim 5 wherein said first predetermined value is substantially equal to $M_i - 0.5$, said second predetermined value is substantially equal to $M_i + 0.5$, $i = 1, 2, \ldots, N_1$, and wherein each of said first differential switches is uniquely paired with a second differential switch in providing said outputs to a respective one of said combinational logic circuits.

10. Apparatus according to claim 9 wherein said combinational logic circuits comprise an AND circuit and an OR circuit for each of said paired differential switches.

* * * * *